US012730735B2

(12) United States Patent
Cardente et al.

(10) Patent No.: US 12,730,735 B2
(45) Date of Patent: Sep. 8, 2026

(54) DYNAMIC DIRECTED ACYCLIC GRAPH (DAG) OPERATION ASSIGNMENT, COMPILATION, AND EXECUTION ACROSS HETEROGENEOUS COMPUTE SYSTEMS

(71) Applicant: Dell Products L.P., Round Rock, TX (US)

(72) Inventors: John Cardente, Milford, MA (US); Gaurav Chawla, Austin, TX (US); John Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 640 days.

(21) Appl. No.: 18/077,678

(22) Filed: Dec. 8, 2022

(65) Prior Publication Data

US 2024/0193065 A1 Jun. 13, 2024

(51) Int. Cl.
*G06F 9/50* (2006.01)
*G06F 11/34* (2006.01)
*G06F 16/901* (2019.01)

(52) U.S. Cl.
CPC ........ *G06F 11/3409* (2013.01); *G06F 9/5066* (2013.01); *G06F 9/5038* (2013.01); *G06F 16/9024* (2019.01)

(58) Field of Classification Search
None
See application file for complete search history.

(56) References Cited

U.S. PATENT DOCUMENTS

2002/0165701 A1* 11/2002 Lichtenberg ............ G06F 30/15 703/7
2010/0156888 A1 6/2010 Luk et al.
2010/0275192 A1* 10/2010 Serebryany ............ G06F 8/443 717/151
2012/0039190 A1* 2/2012 Vasseur .................. H04L 47/15 370/252
2016/0034306 A1* 2/2016 Galdy .................. G06F 9/4881 718/104
2017/0039239 A1* 2/2017 Saadat-Panah ..... H04L 67/1023
2017/0228222 A1* 8/2017 Boehm ................ G06F 9/4552
2018/0107506 A1* 4/2018 Suzuki ................. G06F 9/5027
2018/0267784 A1* 9/2018 Wang ...................... G06F 8/433
2018/0365060 A1* 12/2018 Ahmed ................ G06F 9/4881
2018/0373540 A1* 12/2018 Bao ...................... G06F 9/5038
(Continued)

*Primary Examiner* — Abu Zar Ghaffari
(74) *Attorney, Agent, or Firm* — Joseph Mencher

(57) ABSTRACT

A Directed Acyclic Graph (DAG) performance system includes a DAG management system that is coupled to each of a plurality of compute systems. The DAG management system stores a dynamic DAG, receives a request to perform the dynamic DAG, and identifies a plurality of DAG operations included in the dynamic DAG. The DAG management system then determines a respective compute system type that is configured to perform each of the plurality of DAG operations, and identifies a subset of the plurality of compute systems that each include one of the respective compute system types. The DAG management system then selects a respective compute system from the subset of the plurality of compute systems to perform each of the plurality of DAG operations, and transmits a respective instruction to perform one of the plurality of DAG operations to each respective compute system that was selected to perform that DAG operation.

20 Claims, 15 Drawing Sheets

(56) References Cited

U.S. PATENT DOCUMENTS

| | | | | |
|---|---|---|---|---|
| 2020/0364036 | A1* | 11/2020 | De Smet | G06F 8/427 |
| 2021/0406068 | A1* | 12/2021 | Chen | G06F 16/9024 |
| 2022/0121946 | A1* | 4/2022 | Safnuk | G06N 3/09 |
| 2023/0012710 | A1* | 1/2023 | Amarnath | G06F 9/5066 |

* cited by examiner

DYNAMIC DIRECTED ACYCLIC GRAPH (DAG) OPERATION ASSIGNMENT, COMPILATION, AND EXECUTION ACROSS HETEROGENEOUS COMPUTE SYSTEMS

BACKGROUND

The present disclosure relates generally to information handling systems, and more particularly to the performance of Directed Acyclic Graphs (DAGs) by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, sometimes process data using Directed Acyclic Graphs (DAGs). For example, DAGs may include a plurality of DAG operations that are performed on data in order to provide data pipelines, Machine Learning models, and/or other datasets known in the art. However conventional DAGs are static (and are also referred to below as "static" DAGs) in that each DAG operation included in that conventional/static DAG includes a DAG operation instruction set that was previously compiled for execution by a particular type of processor (e.g., a Central Processing Unit (CPU), a Graphics Processing Unit (GPU), etc.). As such, a conventional/static DAG must be performed by a "target" platform (e.g., a server device) that includes the particular type of processor that is configured to execute its DAG operations. Furthermore, while in some situations a conventional/static DAG may have its DAG operations "broken up" and performed by different target platforms (e.g., different server devices), each of those DAG operations must still be performed by a target platform that includes the particular type of processor that is configured to execute that DAG operation. As will be appreciated by one of skill in the art in possession of the present disclosure, the constraining of the use of processing resources with a DAG to those of a type for which its DAG operations are configured may result in the non-optimal/inefficient performance of the DAG, may delay the performance of the DAG in the event it includes a DAG operation configured for execution by a type of processor that is not currently available, and/or may introduce other issues as well.

Accordingly, it would be desirable to provide a DAG performance system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Directed Acyclic Graph (DAG) management engine that is configured to: store a dynamic DAG; receive a request to perform the dynamic DAG; identify a plurality of DAG operations included in the dynamic DAG; determine a respective compute system type that is configured to perform each of the plurality of DAG operations; identify a subset of a plurality of compute systems that each include one of the respective compute system types; select, from the subset of the plurality of compute systems, a respective compute system to perform each of the plurality of DAG operations; and transmit a respective instruction to perform one of the plurality of DAG operations to each respective compute system that was selected to perform that DAG operation.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
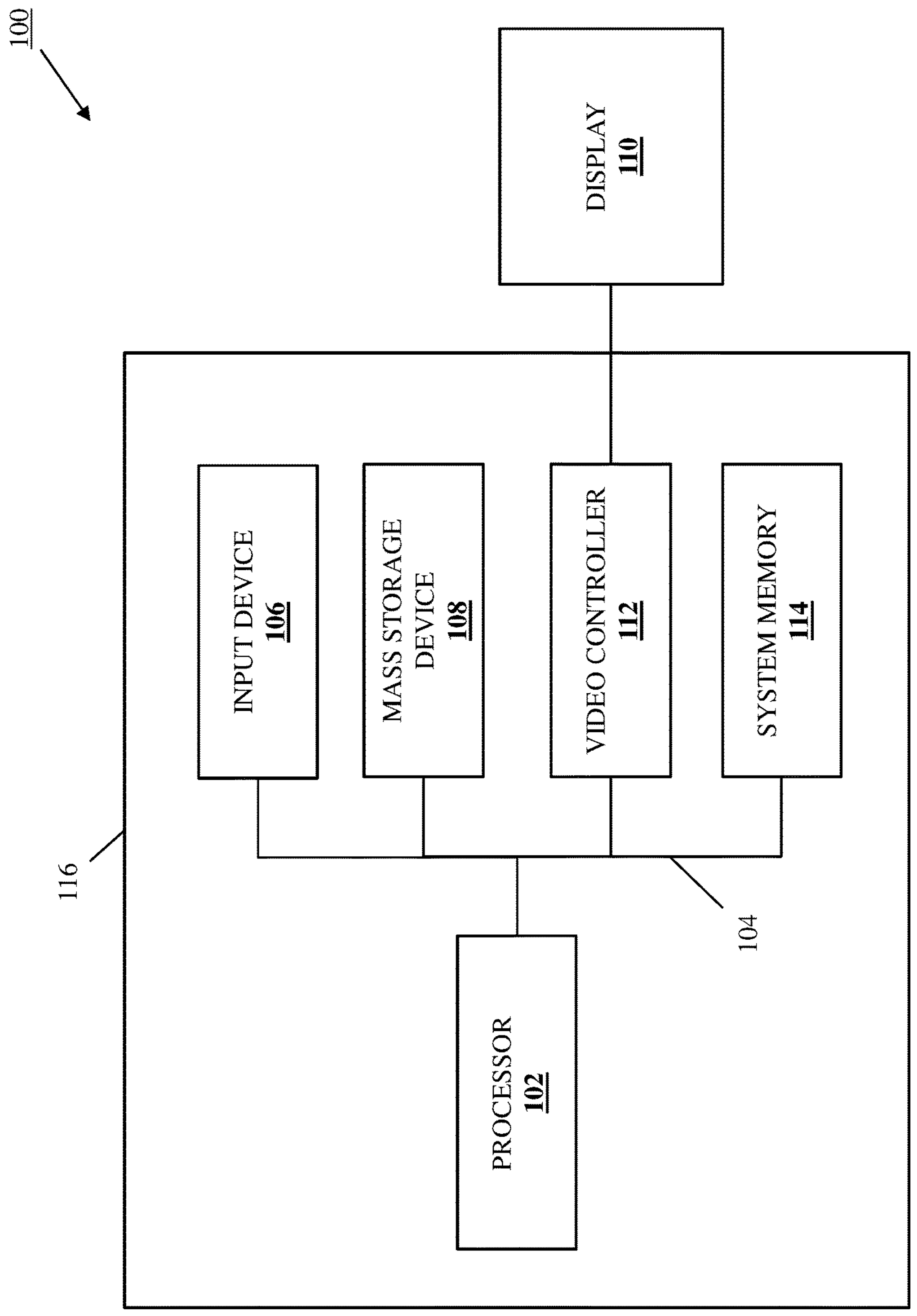
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
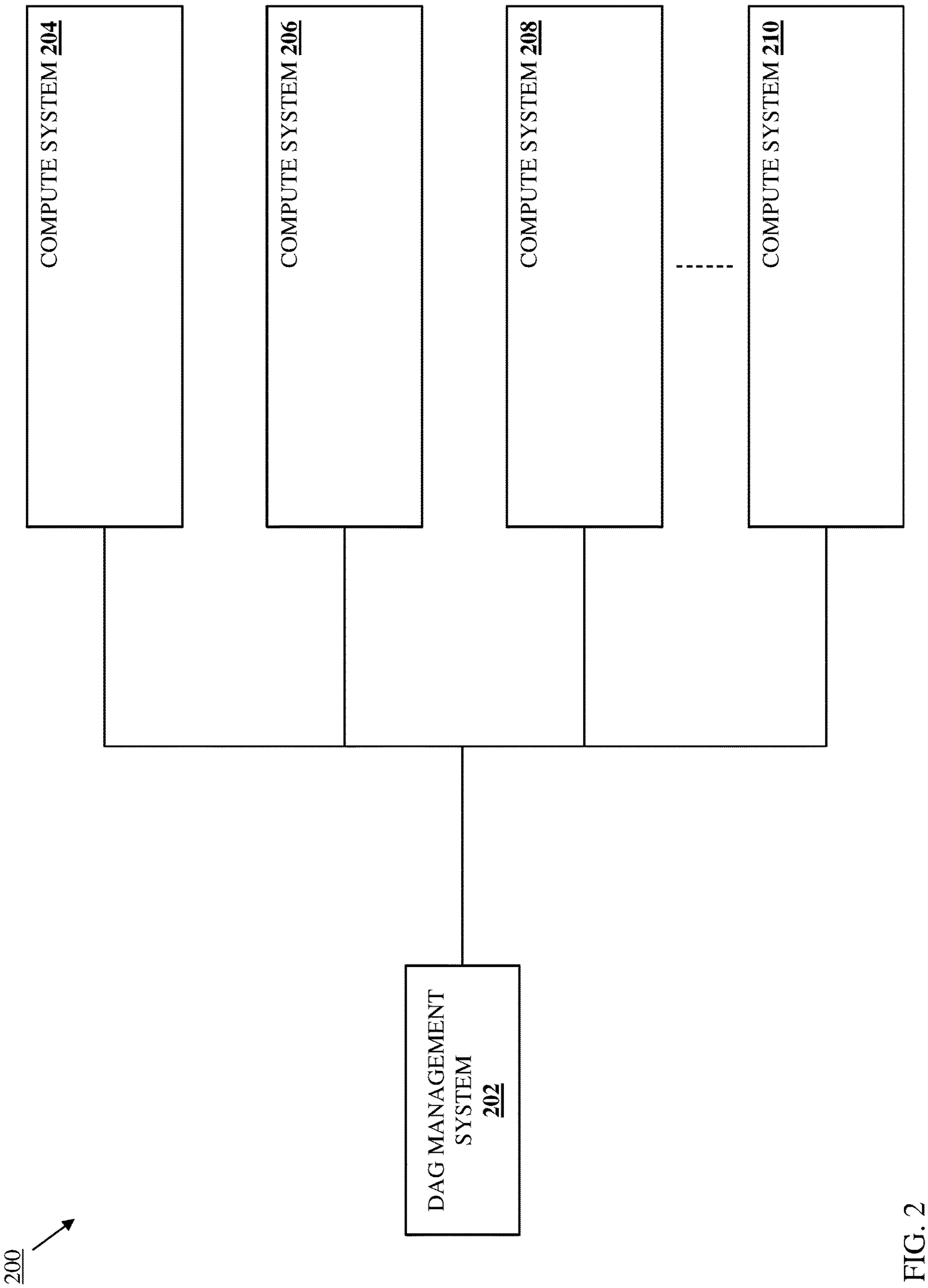
FIG. 2 is a schematic view illustrating an embodiment of a dynamic DAG performance system provided according to the teachings of the present disclosure.

Referring now to FIG. 2, an embodiment of a dynamic DAG performance system 200 is illustrated that may be provided according to the teachings of the present disclosure. In the illustrated embodiment, the dynamic DAG performance system 200 includes a DAG management device 202. In an embodiment, the DAG management device 202 may be provided by the IHS 100 discussed above with reference to FIG. 1, and/or may include some or all of the components of the IHS 100, and in specific examples may be provided by one or more server devices. However, while illustrated and discussed as being provided by server device(s), one of skill in the art in possession of the present disclosure will recognize that DAG management devices provided in the dynamic DAG performance system 200 may include any devices that may be configured to operate similarly as the DAG management device 200 discussed below.

In the illustrated embodiment, the DAG management system 202 is coupled to a plurality of compute systems 204, 206, 208, and up to 210. In the illustrated embodiment, any or each of the plurality of compute systems 204-210 may be provided by the IHS 100 discussed above with reference to FIG. 1, and/or may include some or all of the components of the IHS 100, and in specific examples may be provided by server devices. However, while illustrated and discussed as being provided by server devices, one of skill in the art in possession of the present disclosure will recognize that compute systems provided in the dynamic DAG performance system 200 may include any devices that may be configured to operate similarly as the compute systems 204-210 discussed below. As discussed in further detail below, any of the compute systems may include compute resources for executing DAG operations such as, for example, Central Processing Units (CPUs), Graphics Processing Units (GPUs), Application Specific Integrated Circuits (ASICs), Field Programmable Gate Arrays (FPGAs), Data Processing Units (DPUs), Network Interface Controller (NIC) packet processors, other hardware accelerators, and/or other DAG-operation-executing compute resources that would be apparent to one of skill in the art in possession of the present disclosure. Furthermore, while the discussion herein focuses on the "physical" resources discussed above, one of skill in the art in possession of the present disclosure will appreciate how any of the compute systems 204-210 discussed below may include logical resources (e.g., "slices" of a GPU) that may be used to execute DAG operations similar as described below while remaining within the scope of the present disclosure as well. As such, while a specific dynamic DAG performance system 200 has been illustrated and described, one of skill in the art in possession of the present disclosure will recognize that the dynamic DAG performance system of the present disclosure may include a variety of components and component configurations while remaining within the scope of the present disclosure as well.

Figure 3:
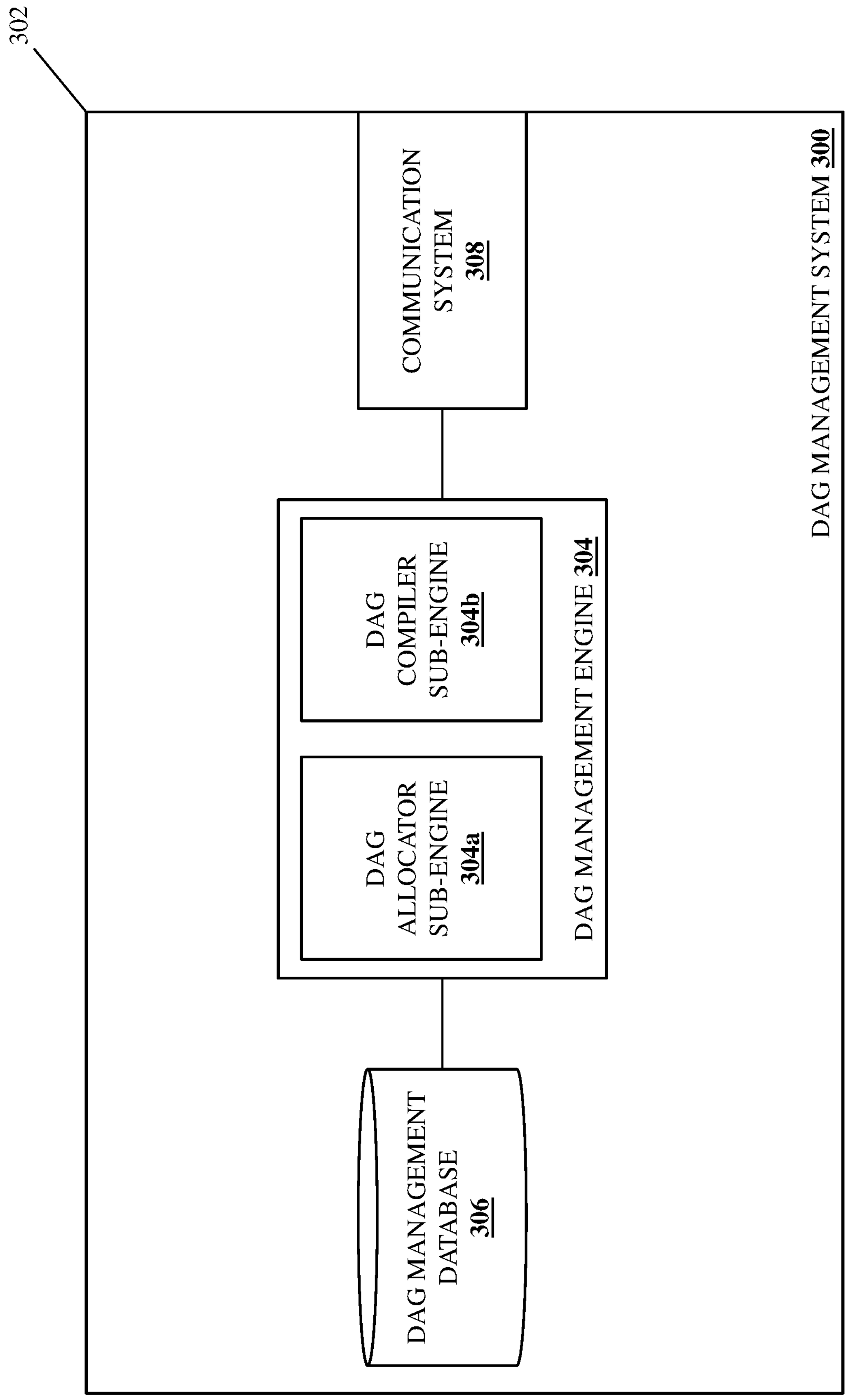
FIG. 3 is a schematic view illustrating an embodiment of a DAG management system that may be included in the DAG performance system of FIG. 2.

Referring now to FIG. 3, an embodiment of a DAG management system 300 is illustrated that may provide the DAG management system 202 discussed above with reference to FIG. 2. As such, the DAG management system 300 may be provided by the IHS 100 discussed above with reference to FIG. 1 and/or may include some or all of the components of the IHS 100, and in specific examples may be provided by one or more server devices. Furthermore, while illustrated and discussed as being provided by server device(s), one of skill in the art in possession of the present disclosure will recognize that the functionality of the DAG management system 300 discussed below may be provided by other devices that are configured to operate similarly as the DAG management system 300 discussed below. In the illustrated embodiment, the DAG management system 300 includes a chassis 302 that houses the components of the DAG management system 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a DAG management engine 304 that is configured to perform the functionality of the DAG management engines and/or DAG management systems discussed below.

In the specific examples provided below, the memory system includes instructions that, when executed by the processing system, cause the processing system to provide a DAG allocator sub-engine 304*a* that is included in the DAG management engine 304 that is configured to perform the functionality of the DAG allocator sub-engines, DAG management engines, and/or DAG management systems discussed below. In the specific examples provided below, the memory system also includes instructions that, when executed by the processing system, cause the processing system to provide a DAG compiler sub-engine 304*b* that is included in the DAG management engine 304 that is configured to perform the functionality of the DAG compiler sub-engines, DAG management engines, and/or DAG management systems discussed below. However, while a specific DAG management engine is illustrated and described, one of skill in the art in possession of the present disclosure will appreciate how the functionality of the DAG management engine 304 may be provided in a variety of manners that will fall within the scope of the present disclosure as well.

The chassis 302 may also house a storage system (not illustrated, but which may include the storage 108 discussed above with reference to FIG. 1) that is coupled to the DAG management engine 304 (e.g., via a coupling between the storage system and the processing system) and that includes a DAG management database 306 that is configured to store any of the information utilized by the DAG management engine 304 discussed below. The chassis 302 may also house a communication system 308 that is coupled to the DAG management engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific DAG management system 300 has been illustrated and described, one of skill in the art in possession of the present disclosure will recognize that DAG management systems (or other devices operating according to the teachings of the present disclosure in a manner similar to that described below for the DAG management system 300) may include a variety of components and/or component configurations for providing conventional DAG management system functionality, as well as the functionality discussed below, while remaining within the scope of the present disclosure as well.

Figure 4:
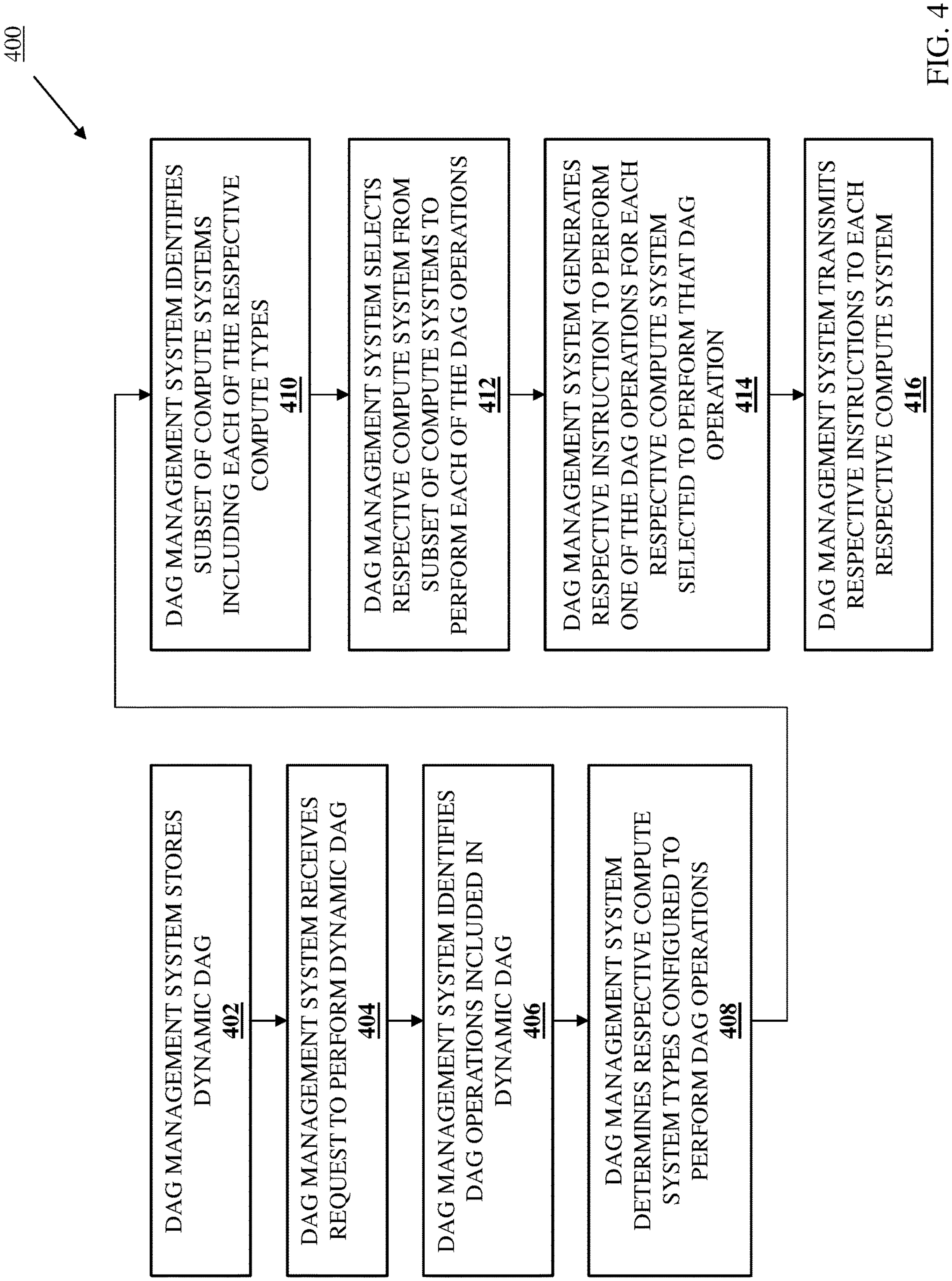
FIG. 4 is a flow chart illustrating an embodiment of a method for performing dynamic DAGs.

Referring now to FIG. 4, an embodiment of a method 400 for performing dynamic DAGs is illustrated. As discussed below, the systems and methods of the present disclosure provide dynamic DAGs that each identify a plurality of DAG operations that are not statically configured for performance by particular compute system types, and instead may be performed by compute systems having compute system types that are determined after a request to perform the DAG is received. For example, the DAG performance system of the present disclosure may include a DAG management system that is coupled to each of a plurality of compute systems. The DAG management system stores a dynamic DAG, receives a request to perform the dynamic DAG, and identifies a plurality of DAG operations included in the dynamic DAG. The DAG management system then determines a respective compute system type that is configured to perform each of the plurality of DAG operations, and identifies a subset of the plurality of compute systems that each include one of the respective compute system types. The DAG management system then selects a respective compute system from the subset of the plurality of compute systems to perform each of the plurality of DAG operations, and transmits a respective instruction to perform one of the plurality of DAG operations to each respective compute system that was selected to perform that DAG operation. As such, each of the DAG operations in a DAG may be performed by the optimal resources at any given time.

Figure 5A:
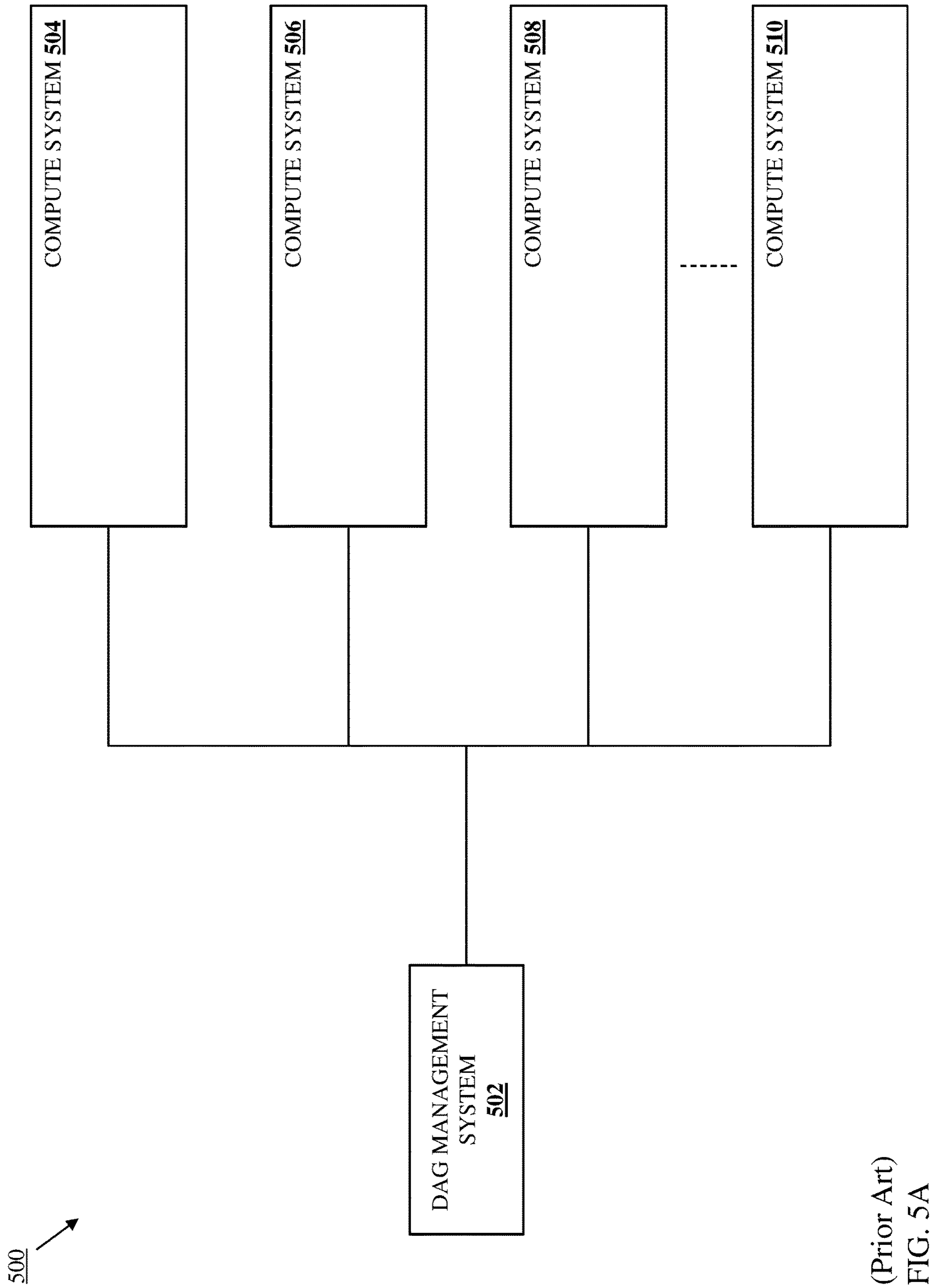
FIG. 5A is a schematic view illustrating an embodiment of a conventional/static DAG performance system.
Figure 5B:
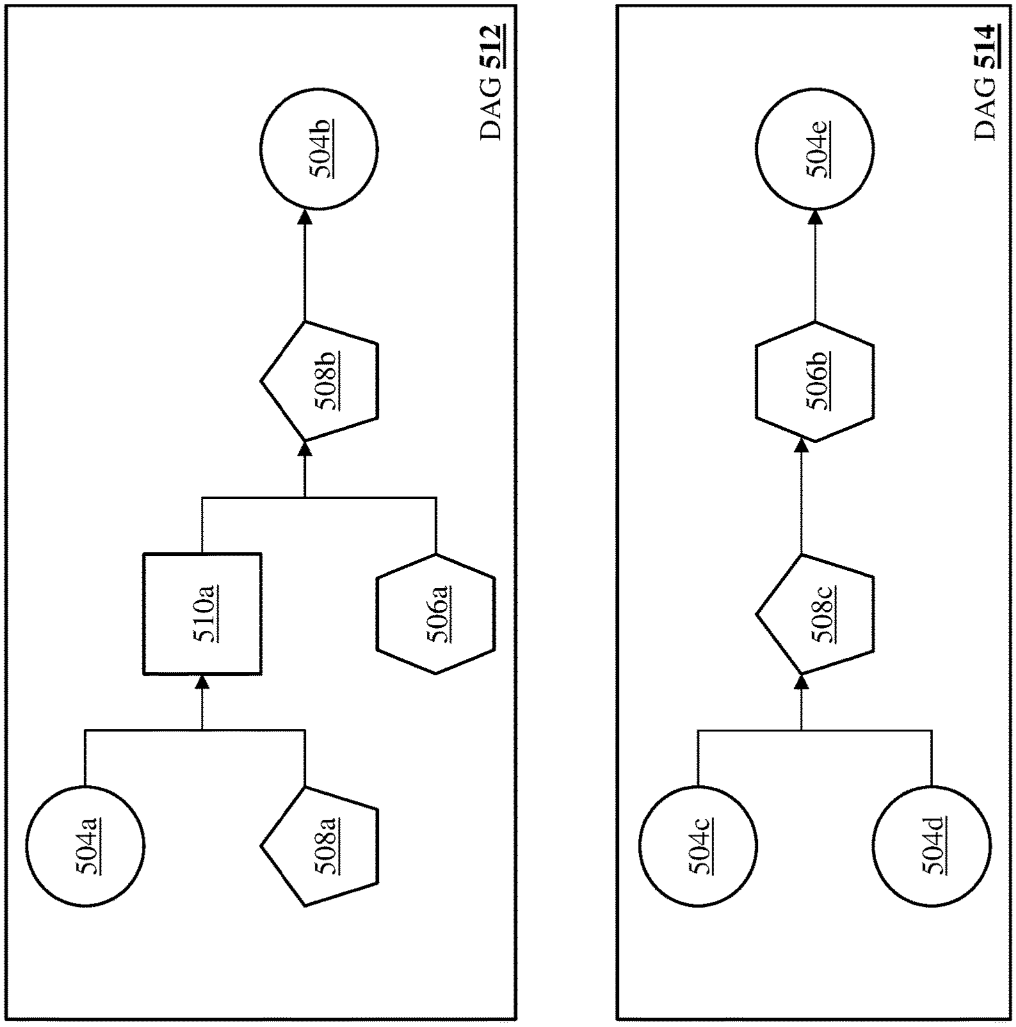
FIG. 5B is a schematic view illustrating an embodiment of conventional/static DAGs that may be performed by conventional/static DAG performance system of FIG. 5A.
Figure 5C:
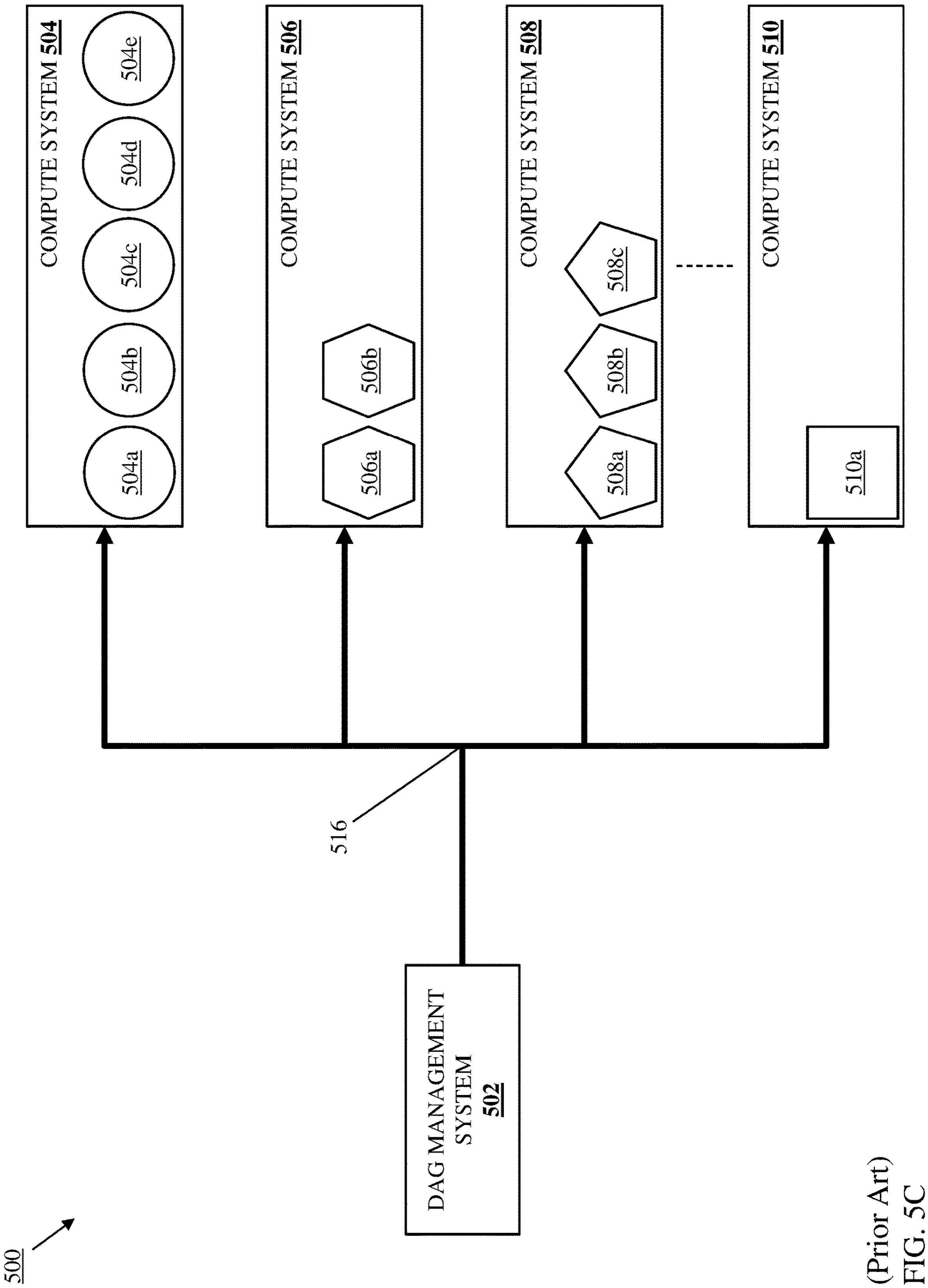
FIG. 5C is a schematic view illustrating an embodiment of the conventional/static DAG performance system of FIG. 5A performing the conventional/static DAGs of FIG. 5B.

With reference to FIGS. 5A, 5B, and 5C, an embodiment of a conventional static DAG performance system 500 (and the operation thereof) is illustrated and described for the purposes of comparison to the DAG performance system of the present disclosure. With reference to FIG. 5A, the conventional static DAG performance system 500 includes a DAG management system 502 coupled to a plurality of compute systems 504, 506, 508, and up to 510. With reference to FIG. 5B, a static DAG 512 includes a DAG operation 504*a* that is defined to be performed by a compute system type provided by the compute system 504, and a DAG operation 508*a* that is defined to be performed by a compute system type provided by the compute system 508. The DAG operations 504*a* and 508*a* provide DAG operation results to a DAG operation 510*a* that is included in the static DAG 512 and that is defined to be performed by a compute system type provided by the compute system 510. The static DAG 512 also includes a DAG operation 506*a* that is defined to be performed by a compute system type provided by the compute system 506, and the DAG operations 510*a* and 506*a* provide DAG operation results to a DAG operation 508*b* that is included in the static DAG 512 and that is defined to be performed by a compute system type provided by the compute system 508. The DAG operation 508*b* provides a DAG operation result to a DAG operation 504*b* that is included in the static DAG 512 and that is defined to be performed by a compute system type provided by the compute system 504.

With continued reference to FIG. 5B, a static DAG 514 includes a DAG operation 504*c* that is defined to be performed by a compute system type provided by the compute system 504, and a DAG operation 504*d* that is defined to be performed by a compute system type provided by the compute system 504. The DAG operations 504*c* and 504*d* provide DAG operation results to a DAG operation 508*c* that is included in the static DAG 514 and that is defined to be performed by a compute system type provided by the compute system 508. The DAG operation 508*c* provides a DAG operation result to a DAG operation 506*b* that is included in the static DAG 514 and that is defined to be performed by a compute system type provided by the compute system 506, and the DAG operation 506*b* provides a DAG operation result to a DAG operation 504*e* that is included in the static DAG 514 and that is defined to be performed by a compute system type provided by the compute system 504.

With reference to FIG. 5C, the DAG management system 502 may perform DAG performance operations 516 that include performing the static DAGs 512 and 514 by instructing, assigning, and/or otherwise causing the compute systems 504-510 to perform the DAG operations that are included in the static DAGs 512 and 514 and that are defined to be performed by the compute system type provided by those compute systems. As such, and as illustrated in FIG. 5C, the compute system 504 may perform the DAG operations 504*a*, 504*b*, 504*c*, 504*d*, and 504*c* that are defined to be performed by the compute system type provided by the compute system 504, the compute system 506 may perform the DAG operations 506*a* and 506*b* that are defined to be performed by the compute system type provided by the compute system 506, the compute system 508 may perform the DAG operations 508*a*, 508*b*, and 508*c* that are defined to be performed by the compute system type provided by the compute system 508, and the compute system 510 may perform the DAG operation 510*a* that is defined to be performed by the compute system type provided by the compute system 510.

As can be seen, the conventional static DAG performance system 500 may result in the uneven DAG operation "loading" of the compute system 504 relative to the compute systems 506, 508, and 510. Furthermore, such conventional static DAG performance systems prevent the use of alternative resources that may be capable of performing a DAG operation with relatively higher performance, relatively lower cost, relatively lower resource utilization, and/or other benefits known in the art, thus preventing optimal resource allocation by the static DAG performance system 500 in its performance of DAGs and corresponding servicing of applications and/or other entities that require the performance of those DAGs. As discussed below, the dynamic DAGs of the present disclosure allow the dynamic DAG performance system described herein to determine one or more types of compute systems that may perform any DAG operations in a DAG, and then select the optimal compute system to perform those DAG operations based on, for example, performance requirements of an application requesting the DAG, competing resource demands on the compute systems, and/or other factors that would be apparent to one of skill in the art in possession of the present disclosure, thus allowing the DAG operations in the DAG to be performed by the optimal compute systems at any particular time.

Figure 6:
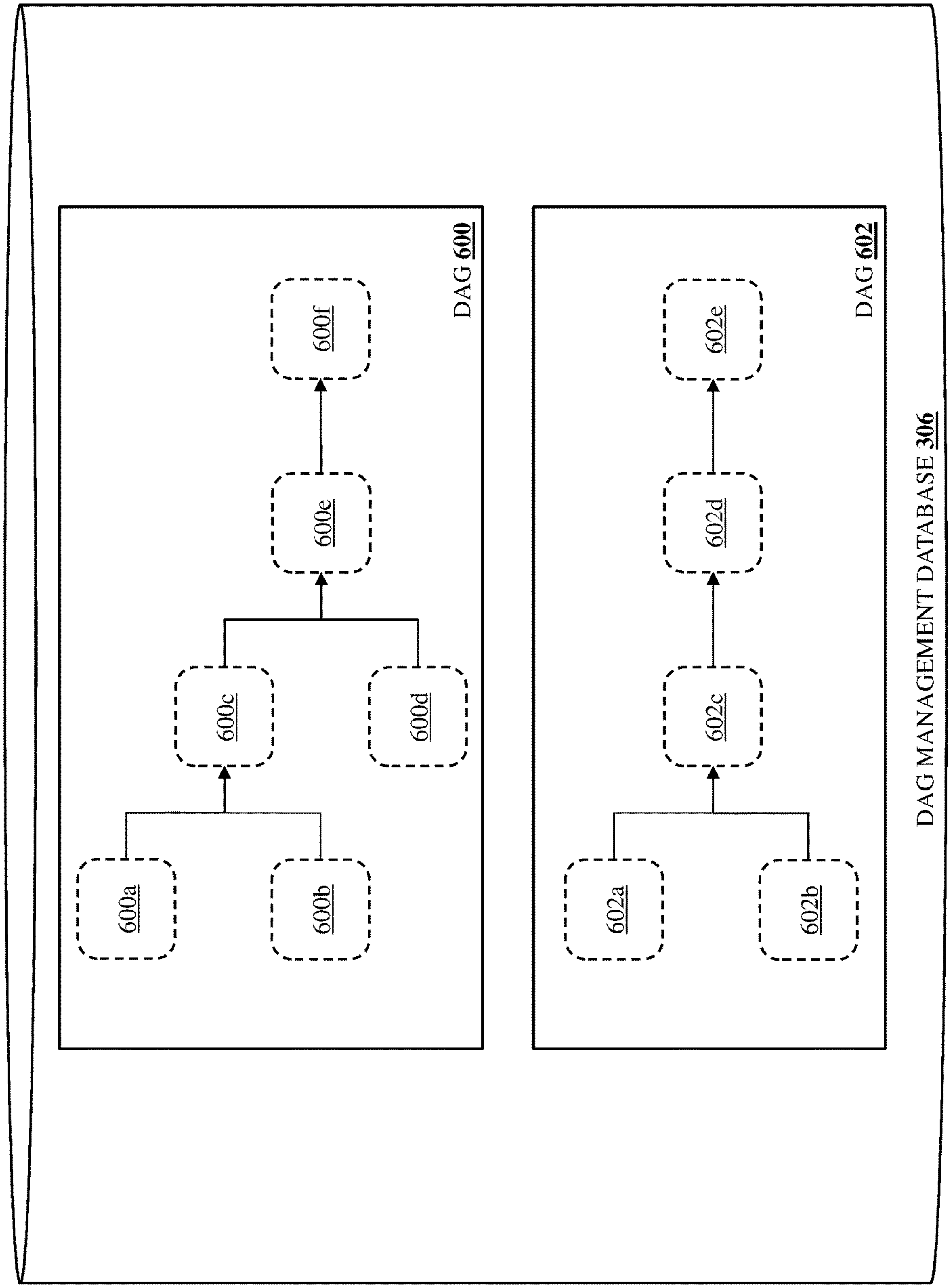
FIG. 6 is a schematic view illustrating an embodiment of dynamic DAGs that may be used by the DAG management system of FIG. 3 during the method of FIG. 4.

The method 400 begins at block 402 where a DAG management system stores a dynamic DAG. In an embodiment, at block 402, dynamic DAGs provided according to the teachings of the present disclosure may be stored in the DAG management database 306 included in the DAG management system 202/300. However, while described as being stored in the DAG management system 202/300, one of skill in the art in possession of the present disclosure will appreciate how the dynamic DAGs of the present disclosure may be stored in any DAG management database that is accessible to the DAG management engine 304 in the DAG management system 202/300 while remaining within the scope of the present disclosure as well. With reference to FIG. 6, embodiments of dynamic DAGs 600 and 602 are illustrated as included in the DAG management database 306.

As can be seen, the dynamic DAG 600 includes a DAG operation 600*a* that may identify the functional requirements of the DAG operation 600*a* without defining a particular computing system type that must perform that DAG operation 600*a*, and a DAG operation 600*b* that may identify the functional requirements of the DAG operation 600*b* without defining a particular computing system type that must perform that DAG operation 600*b*. The DAG operations 600*a* and 600*b* provide DAG operation results to a DAG operation 600*c* that is included in the dynamic DAG 600 and that may identify the functional requirements of the DAG operation 600*c* without defining a particular computing system type that must perform that DAG operation 600*c*. The dynamic DAG 600 also includes a DAG operation 600*d* that is included in the dynamic DAG 600 and that may identify the functional requirements of the DAG operation 600*d* without defining a particular computing system type that must perform that DAG operation 600*d*, and the DAG operations 600*c* and 600*d* provide DAG operation results to a DAG operation 600*e* that is included in the dynamic DAG 600 and that may identify the functional requirements of the DAG operation 600*e* without defining a particular computing system type that must perform that DAG operation 600*c*. The DAG operation 600*e* provides a DAG operation result to a DAG operation 600*f* that is included in the dynamic DAG 600 and that may identify the functional requirements of the DAG operation 600*f* without defining a particular computing system type that must perform that DAG operation 600*f*.

The dynamic DAG 602 includes a DAG operation 602*a* that may identify the functional requirements of the DAG operation 602*a* without defining a particular computing system type that must perform that DAG operation 602*a*, and a DAG operation 602*b* that may identify the functional requirements of the DAG operation 602*b* without defining a particular computing system type that must perform that DAG operation 602*b*. The DAG operations 602*a* and 602*b* provide DAG operation results to a DAG operation 602*c* that is included in the dynamic DAG 602 and that may identify the functional requirements of the DAG operation 602*c* without defining a particular computing system type that must perform that DAG operation 602*c*. The DAG operation 602*c* provides a DAG operation result to a DAG operation 602*d* that is included in the dynamic DAG 602 and that may identify the functional requirements of the DAG operation 602*d* without defining a particular computing system type that must perform that DAG operation 602*d*, and the DAG operation 602*d* provides a DAG operation result to a DAG operation 602*e* that is included in the dynamic DAG 602 and that may identify the functional requirements of the DAG operation 602*e* without defining a particular computing system type that must perform that DAG operation 602*c*.

In a specific example, the dynamic DAGs 600 and 602 may represent their DAG operations as abstracted, intermediate forms defined by the Open Neural Network exchange (ONNX) standards, Multi-Level Intermediate Representation (MLIR), and/or using other techniques that one of skill in the art in possession of the present disclosure would recognize as allowing the DAG operations (e.g., computations and/or other executables used to perform the DAG operations) to be expressed at a relatively high level that identifies inputs consumed, outputs generated, and/or other functional requirements of the DAG operations without specifying details about the type of compute system that will consume those inputs, generate those outputs, and/or perform those other functional requirements. However, while specific techniques have been described for providing the dynamic DAGs of the present disclosure, one of skill in the art in possession of the present disclosure will appreciate how the dynamic DAGs of the present disclosure may be provided in other manners that will fall within the scope of the present disclosure as well.

As will be appreciated by one of skill in the art in possession of the present disclosure, the dynamic DAGs of the present disclosure may be configured to be performed on data pipelines, Machine Learning models, combinations thereof, and/or other datasets that would be apparent to one of skill in the art in possession of the present disclosure. To provide a specific example, a dynamic DAG may be configured to provide for the pre-processing of video data for use in a Machine Learning model by, for example, receiving or retrieving a video data stream including video data, translating that video data to a different format (e.g., from a video format such as MP4 to an image format such PNG), resizing the translated video data with dimensions utilized by the Machine Learning model, treating the resized, translated video data to fit the expectations/configuration of the Machine Learning model, and/or performing other DAG operations that would be apparent to one of skill in the art in possession of the present disclosure. As will be appreciated by one of skill in the art in possession of the present disclosure, the different DAG operations of the dynamic DAG discussed above may benefit from being performed by different compute systems or components that may perform particular operations more efficiently. However, while a specific example of a dynamic DAG has been described, one of skill in the art in possession of the present disclosure will appreciate how dynamic DAGs may be configured to provide any of a variety of DAG results while remaining within the scope of the present disclosure as well.

The method 400 then proceeds to block 404 where the DAG management system receives a request to perform the dynamic DAG. In an embodiment, at block 404, the DAG management engine 304 in the DAG management system 202/300 may receive a request to perform a dynamic DAG from a user, an application, and/or any other DAG performance requesting entity that would be apparent to one of skill in the art in possession of the present disclosure. As such, one of skill in the art in possession of the present disclosure will appreciate how the request to perform the dynamic DAG may be received by the DAG management engine 304 directly from an application in the DAG management system 202/300, from a user via an input device connected to the DAG management system 202/300, via a network and through the communication system 308, and/or in any of a variety of other manners while remaining within the scope of the present disclosure as well.

Figure 7:
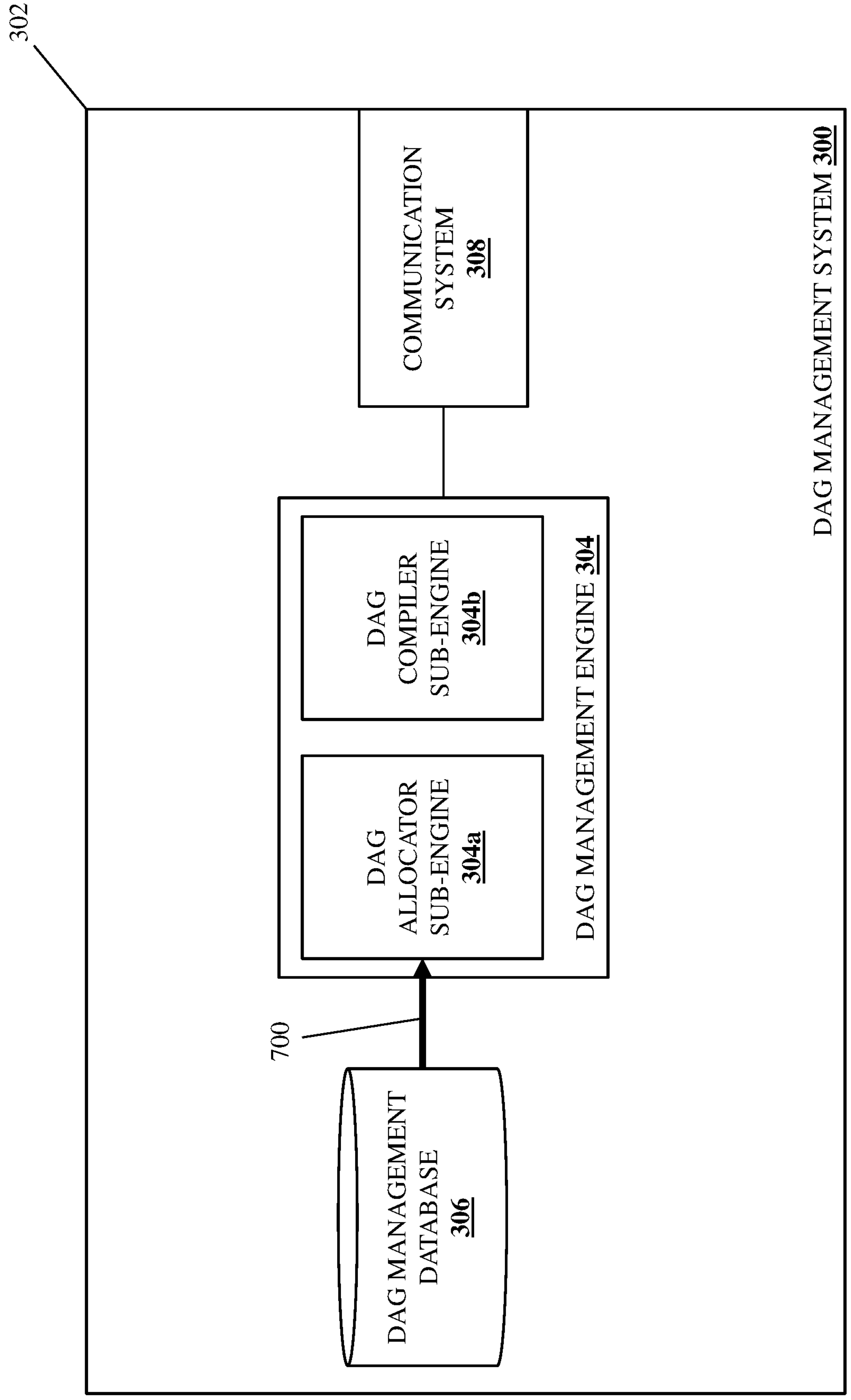
FIG. 7 is a schematic view illustrating an embodiment of the DAG management system of FIG. 3 operating during the method of FIG. 4.

The method 400 then proceeds to block 406 where the DAG management system identifies DAG operations included in the dynamic DAG. With reference to FIG. 7, in an embodiment of block 406 and in response to receiving the request to perform the dynamic DAG, the DAG allocator sub-engine 304*a* in the DAG management engine 304 of the DAG management system 202/300 may perform dynamic DAG retrieval operations 700 to retrieve that dynamic DAG from the DAG management database 306 and identify the DAG operations included in that DAG. For example, the DAG allocator sub-engine 304*a* in the DAG management engine 304 may retrieve the dynamic DAG 600 from the DAG management database 306 and identify the DAG operations 600*a*-600*f* included in that dynamic DAG 600. In another example, the DAG allocator sub-engine 304*a* in the DAG management engine 304 may retrieve the dynamic DAG 602 from the DAG management database 306 and identify the DAG operations 602*a*-602*e* included in that dynamic DAG 602.

The method 400 then proceeds to block 408 where the DAG management system determines respective compute system types configured to perform the DAG operations. In an embodiment, at block 408, the DAG allocator sub-engine 304*a* in the DAG management engine 304 of the DAG management system 202/300 may perform compute system type determination operations to determine one or more compute system types that are configured to perform each DAG operation identified at block 406. As will be appreciated by one of skill in the art in possession of the present disclosure, the functional requirements identified by each of the DAG operations in the dynamic DAGs may be satisfied by one or more compute system types that may include CPUs, GPUs, ASICs, FPGAs, DPUs, NIC packet processors, other hardware accelerators, and/or other DAG-operation-executing compute resources that would be apparent to one of skill in the art in possession of the present disclosure.

In some embodiment, the DAG allocator sub-engine 304*a* in the DAG management engine 304 may be configured (either during the method 400 or prior to the method 400) to identify the compute system types of the compute systems 204-210, the compute capabilities of the compute systems 204-210, and/or other DAG operation performance functionality provided by each of the compute systems 204-210, for use in determining the available compute system types and/or other functionality that is available for performing DAG operations. Continuing with the specific examples provided above, the DAG allocator sub-engine 304*a* may identify the functional requirements of each of the DAG operations 600*a*-600*f* included in the dynamic DAG 600 and determine the compute system type(s) that satisfy the functional requirements of each of the DAG operations 600*a*-600*f*, and/or may identify the functional requirements of each of the DAG operations 602*a*-602*e* included in the dynamic DAG 602 and determine the compute system type(s) that satisfy the functional requirements of each of the DAG operations 602*a*-602*c*.

The method 400 then proceeds to block 410 where the DAG management system identifies a subset of compute systems including each of the respective compute types. As discussed above, the compute systems 204-210 may include compute systems types such as the CPUs, GPUS, ASICs, FPGAs, DPUs, NIC packet processors, other hardware accelerators, and/or other DAG-operation-executing compute resources discussed above. As such, in an embodiment of block 410, the DAG allocator sub-engine 304*a* in the DAG management engine 304 of the DAG management system 202/300 may, for each compute system type that was determined at block 408 as being configured to perform at least one of the DAG operations in the dynamic DAG (e.g., that compute system type was determined to satisfy the functional requirements of at least one of the DAG operations in the dynamic DAG), determine at least one of the compute systems 204-210 that includes that compute system type.

As such, if an FPGA is configured to perform the DAG operation 600*a* in the dynamic DAG 600 (e.g., an FPGA satisfies the functional requirements of the DAG operation 600*a*), at block 410, the DAG allocator sub-engine 304*a* in the DAG management engine 304 may identify each of the compute system(s) 204/210 that include an FPGA. Similarly, if a GPU and an ASIC are configured to perform the DAG operation 602*b* in the dynamic DAG 602 (e.g., a GPU and an ASCI satisfy the functional requirements of the DAG operation 602*b*), at block 410 the DAG allocator sub-engine 304*a* in the DAG management engine 304 may identify each of the compute system(s) 204/210 that include a GPU and/or an ASIC. Thus, one of skill in the art in possession of the present disclosure will appreciate how a subset of the compute systems 204-210 may be identified at block 410 as including the compute system types that were determined at block 408 as being configured to perform each of the DAG operations included in a dynamic DAG that was requested for performance at block 402.

The method 400 then proceeds to block 412 where the DAG management system selects a respective compute system from the subset of the compute systems to perform each of the DAG operations. In an embodiment, at block 412, the DAG allocator sub-engine 304*a* in the DAG management engine 304 of the DAG management system 202/300 may select, for each DAG operation in the dynamic DAG that was requested for performance at block 402, a compute system that includes the compute system type that was determined at block 408 as being configured to perform that DAG operation. As will be appreciated by one of skill in the art in possession of the present disclosure, in the event only a single compute system is identified as including the compute system type that is configured to perform a DAG operation included in the dynamic DAG, that compute system may be selected to perform that DAG operation.

However, one of skill in the art in possession of the present disclosure will appreciate how a plurality of compute systems may be identified as including the compute system type that is configured to perform any particular DAG operation included in the dynamic DAG, and in such situations the DAG allocator sub-engine 304*a* in the DAG management engine 304 may select one of those compute systems to perform that DAG operation based on a variety of factors. For example, the DAG allocator sub-engine 304*a* in the DAG management engine 304 of the DAG management system 202/300 may select a compute system to perform a DAG operation at block 412 based on the performance requirements of an application that requested the performance of the dynamic DAG, the performance requirements of the DAG, the performance requirements of the DAG operation, resource demands on the compute systems 204-210, a priority of the application that requested the performance of the dynamic DAG, a priority of the DAG, a priority of the DAG operation, a proximity of the compute system (relative to the other compute systems) to data that is utilized as part of the DAG operation, a number of data transfers required to allow the compute system to perform the DAG operation (relative to the other compute systems), and/or any other factors that would be appreciated by one of skill in the art in possession of the present disclosure.

As such, one of skill in the art in possession of the present disclosure will appreciate how a particular compute system may be selected from the compute systems 204-210 to perform a DAG operation at block 412 due that compute system best satisfying the performance requirements of an application that requested the performance of the dynamic DAG, due that compute system best satisfying the performance requirements of the DAG, due that compute system best satisfying the performance requirements of the DAG operation, due to the resource demands on that compute system being the lowest (or at least below a threshold), due that compute system best satisfying a priority of the application that requested the performance of the dynamic DAG, due that compute system best satisfying a priority of the DAG, due that compute system best satisfying a priority of the DAG operation, due to that compute system being proximate to data that is utilized as part of the DAG operation (e.g., closer than the other compute systems, below a proximity threshold, etc.), due to a number of data transfers required to allow that compute system to perform the DAG operation being lower than the other compute systems (or at least below a threshold), and/or due to any other factors that would be appreciated by one of skill in the art in possession of the present disclosure. However, while specific factors for selecting a compute system to perform a DAG operation have been described, other techniques (e.g., Artificial Intelligence/Machine Learning models) may be utilized in the selection of compute systems to perform DAG operations while remaining within the scope of the present disclosure as well.

The method 400 then proceeds to block 414 where the DAG management system generates a respective instruction to perform one of the DAG operations for each respective compute system selected to perform that DAG operation. As described below, the performance of the DAG operations in the dynamic DAG by the compute systems selected to do so may be enabled in a variety of manners. For example, in some embodiments of block 414, the DAG management engine 304 in the DAG management system 202/300 may be configured to generate a respective instruction set for each DAG operation in the dynamic DAG that is configured for execution, by the compute system selected to perform that DAG operation, in order to provide for the performance of that DAG operation. As such, one of skill in the art in possession of the present disclosure will appreciate how the DAG management engine 304 may be configured to compile, generate, and/or other produce instruction sets for the DAG operations in a dynamic DAG "just in time" following the request to perform that dynamic DAG in order to allow the compute systems selected to perform those DAG operations to do so.

Figure 8A:
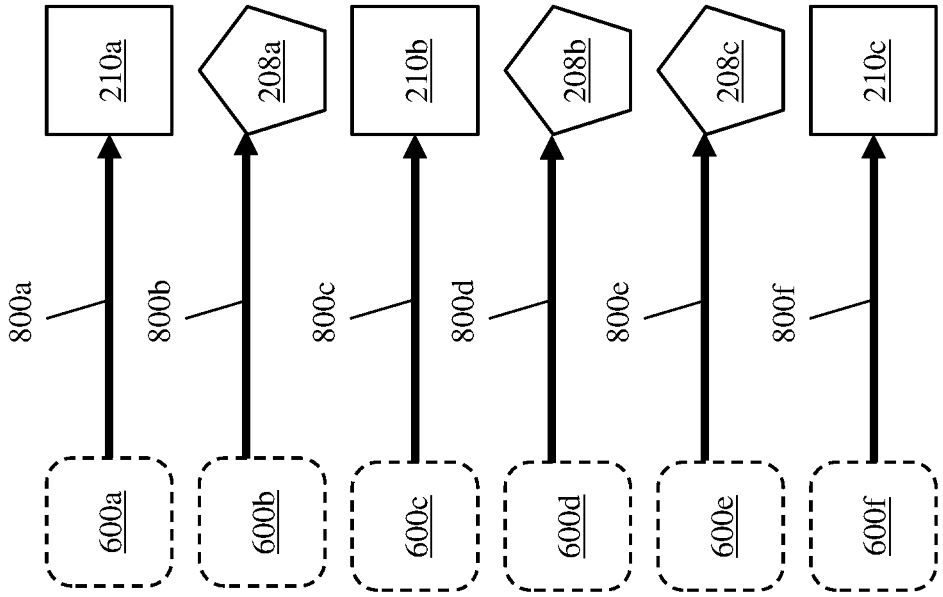
FIG. 8A is a schematic view illustrating an embodiment of the use of the dynamic DAGs of FIG. 6 during the method of FIG. 3.

For example, with reference to FIG. 8A, in an embodiment of block 414 the DAG compiler sub-engine 304*b* in the DAG management engine 304 of the DAG management system 202/300 may perform instruction generation operations 800*a* that may include compiling a DAG operation 210*a* that is based on the DAG operation 600*a* (e.g., that is configured to perform the functional requirements of the DAG operation 600*a*) and that includes an instruction set that is configured for execution by the compute system 210 that was selected to perform the DAG operation 600*a* at block 412. Similarly, at block 414, the DAG compiler sub-engine 304*b* in the DAG management engine 304 of the DAG management system 202/300 may perform instruction generation operations 800*b* that may include compiling a DAG operation 208*a* that is based on the DAG operation 600*b* (e.g., that is configured to perform the functional requirements of the DAG operation 600*b*) and that includes an instruction set that is configured for execution by the compute system 208 that was selected to perform the DAG operation 600*b* at block 412. Similarly as well, at block 414, the DAG compiler sub-engine 304*b* in the DAG management engine 304 of the DAG management system 202/300 may perform instruction generation operations 800*c* that may include compiling a DAG operation 210*b* that is based on the DAG operation 600*c* (e.g., that is configured to perform the functional requirements of the DAG operation 600*c*) and that includes an instruction set that is configured for execution by the compute system 210 that was selected to perform the DAG operation 600*c* at block 412.

Similarly as well, at block 414, the DAG compiler sub-engine 304*b* in the DAG management engine 304 of the DAG management system 202/300 may perform instruction generation operations 800*d* that may include compiling a DAG operation 208*b* that is based on the DAG operation 600*d* (e.g., that is configured to perform the functional requirements of the DAG operation 600*d*) and that includes an instruction set that is configured for execution by the compute system 208 that was selected to perform the DAG operation 600*d* at block 412. Similarly as well, at block 414, the DAG compiler sub-engine 304*b* in the DAG management engine 304 of the DAG management system 202/300 may perform instruction generation operations 800*e* that may include compiling a DAG operation 208*c* that is based on the DAG operation 600*e* (e.g., that is configured to perform the functional requirements of the DAG operation 600*e*) and that includes an instruction set that is configured for execution by the compute system 208 that was selected to perform the DAG operation 600*e* at block 412. Similarly as well, at block 414, the DAG compiler sub-engine 304*b* in the DAG management engine 304 of the DAG management system 202/300 may perform instruction generation operations 800*f* that may include compiling a DAG operation 210*c* that is based on the DAG operation 600*f* (e.g., that is configured to perform the functional requirements of the DAG operation 600*f*) and that includes an instruction set that is configured for execution by the compute system 210 that was selected to perform the DAG operation 600*f* at block 412.

Figure 8B:
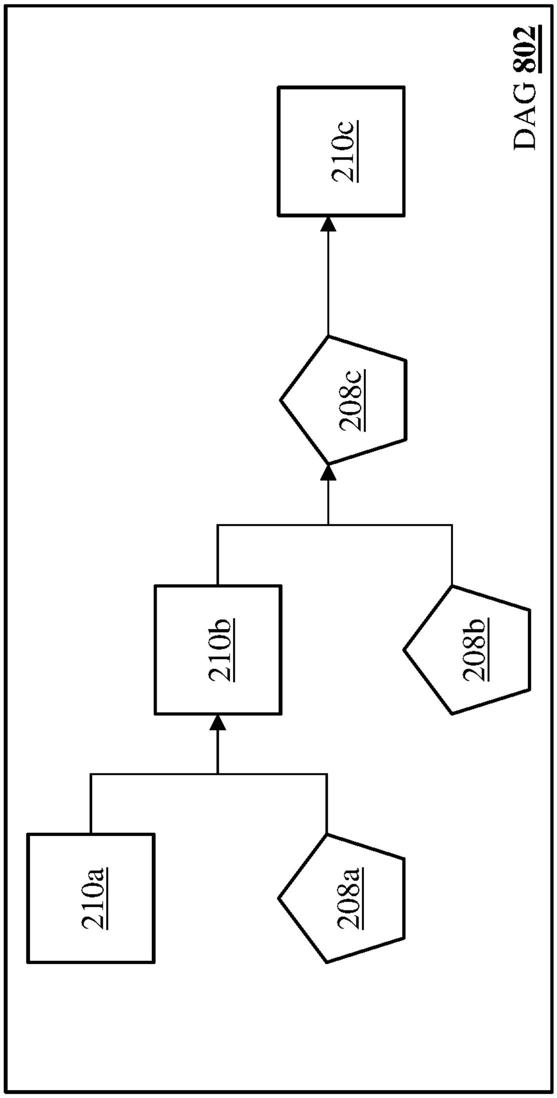
FIG. 8B is a schematic view illustrating an embodiment of the use of the dynamic DAGs of FIG. 6 during the method of FIG. 3.

With reference to FIG. 8B, one of skill in the art in possession of the present disclosure will recognize how the instruction generation operations 800*a*-800*f* operate to transform the dynamic DAG 600 including the DAG operations 600*a*-600*f* to a DAG 802. As can be seen, the DAG 802 includes the DAG operation 210*a* that was configured at block 414 to be performed by the compute system 210, and the DAG operation 208*a* that was configured at block 414 to be performed by the compute system 208. The DAG operations 210*a* and 208*a* provide DAG operation results to the DAG operation 210*b* that is included in the DAG 802 and that was configured at block 414 to be performed by the compute system 210. The DAG 802 also includes the DAG operation 208*b* that was configured at block 414 to be performed by the compute system 208, and the DAG operations 210*b* and 208*b* provide DAG operation results to the DAG operation 208*c* that is included in the DAG 802 and that was configured at block 414 to be performed by the compute system 208. The DAG operation 208*c* provides a DAG operation result to the DAG operation 210*c* that is included in the DAG 802 and that was configured at block 414 to be performed by the compute system 210.

However, one of skill in the art in possession of the present disclosure will appreciate that, while the dynamic DAG 600 may provide the DAG 802 and its DAG operations 210*a*-210*c* and 208*a*-208*c* at a particular time and under particular operating conditions for the dynamic DAG performance system 200, the use of the dynamic DAG 600 at a different time and/or under different operating conditions for the dynamic DAG performance system 200 may result in a DAG with one or more DAG operations performed by compute systems that are different than those illustrated and described below as performing the corresponding DAG operations 210*a*-210*c* and 208*a*-208*c*.

Figure 9A:
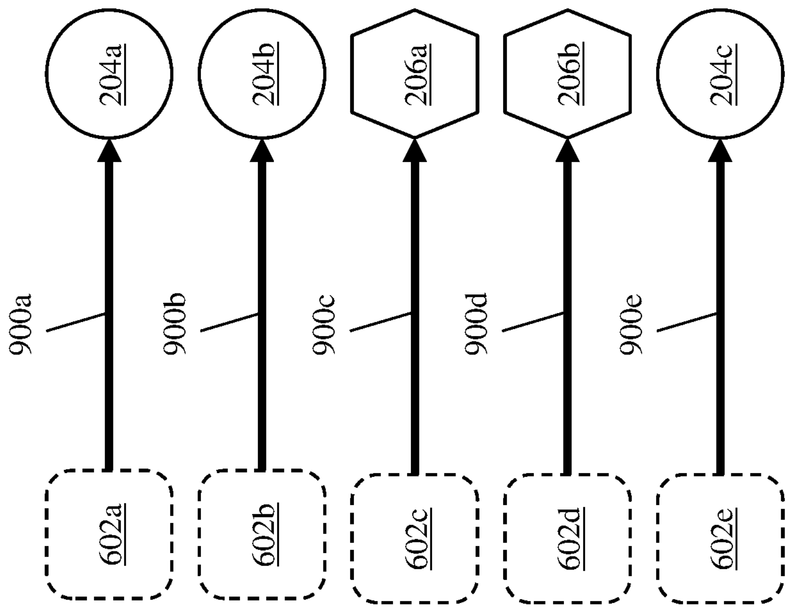
FIG. 9A is a schematic view illustrating an embodiment of the use of the dynamic DAGs of FIG. 6 during the method of FIG. 3.

In another example, with reference to FIG. 9A, in an embodiment of block 414 the DAG compiler sub-engine 304*b* in the DAG management engine 304 of the DAG management system 202/300 may perform instruction generation operations 900*a* that may include compiling a DAG operation 204*a* that is based on the DAG operation 602*a* (e.g., that is configured to perform the functional requirements of the DAG operation 602*a*) and that includes an instruction set that is configured for execution by the compute system 204 that was selected to perform the DAG operation 602*a* at block 412. Similarly, at block 414, the DAG compiler sub-engine 304*b* in the DAG management engine 304 of the DAG management system 202/300 may perform instruction generation operations 900*b* that may include compiling a DAG operation 204*b* that is based on the DAG operation 602*b* (e.g., that is configured to perform the functional requirements of the DAG operation 602*b*) and that includes an instruction set that is configured for execution by the compute system 204 that was selected to perform the DAG operation 602*b* at block 412. Similarly as well, at block 414, the DAG compiler sub-engine 304*b* in the DAG management engine 304 of the DAG management system 202/300 may perform instruction generation operations 900*c* that may include compiling a DAG operation 206*a* that is based on the DAG operation 602*c* (e.g., that is configured to perform the functional requirements of the DAG operation 602*c*) and that includes an instruction set that is configured for execution by the compute system 206 that was selected to perform the DAG operation 602*c* at block 412.

Similarly as well, at block 414, the DAG compiler sub-engine 304*b* in the DAG management engine 304 of the DAG management system 202/300 may perform instruction generation operations 900*d* that may include compiling a DAG operation 206*b* that is based on the DAG operation 602*d* (e.g., that is configured to perform the functional requirements of the DAG operation 602*d*) and that includes an instruction set that is configured for execution by the compute system 206 that was selected to perform the DAG operation 602*d* at block 412. Similarly as well, at block 414, the DAG compiler sub-engine 304*b* in the DAG management engine 304 of the DAG management system 202/300 may perform instruction generation operations 900*e* that may include compiling a DAG operation 204*c* that is based on the DAG operation 602*e* (e.g., that is configured to perform the functional requirements of the DAG operation 602*e*) and that includes an instruction set that is configured for execution by the compute system 204 that was selected to perform the DAG operation 602*e* at block 412.

Figure 9B:
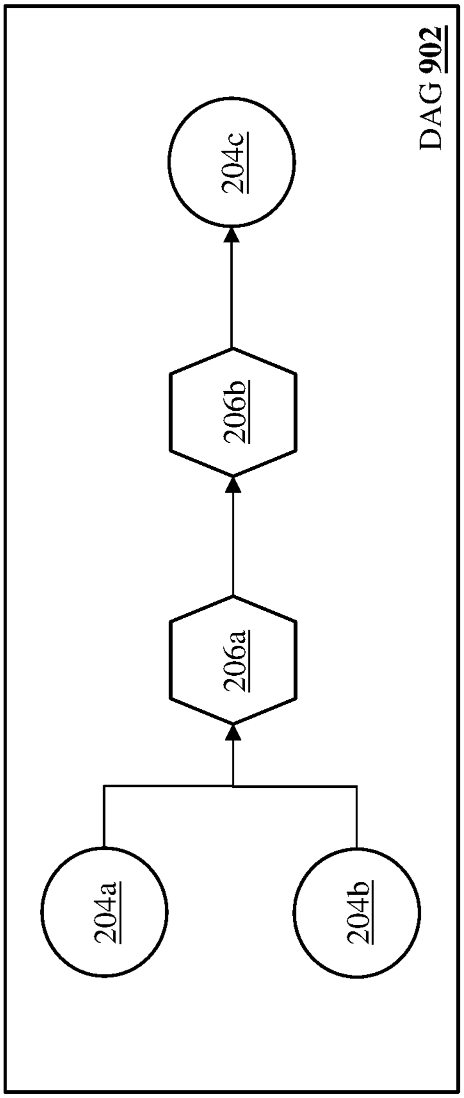
FIG. 9B is a schematic view illustrating an embodiment of the use of the dynamic DAGs of FIG. 6 during the method of FIG. 3.

With reference to FIG. 9B, one of skill in the art in possession of the present disclosure will recognize how the instruction generation operations 900*a*-900*e* operate to transform the dynamic DAG 602 including the DAG operations 602*a*-602*e* to a DAG 902. As can be seen, the DAG 902 includes the DAG operation 204*a* that was configured at block 414 to be performed by the compute system 204, and the DAG operation 204*b* that was configured at block 414 to be performed by the compute system 204. The DAG operations 204*a* and 204*b* provide DAG operation results to the DAG operation 206*a* that is included in the DAG 902 and that was configured at block 414 to be performed by the compute system 206. The DAG operation 206*a* provides a DAG operation result to the DAG operation 206*b* that is included in the DAG 902 and that was configured at block 414 to be performed by the compute system 206, and the DAG operation 206*b* provides a DAG operation result to the DAG operation 204*c* that is included in the DAG 902 and that was configured at block 414 to be performed by the compute system 204.

However, one of skill in the art in possession of the present disclosure will appreciate that, while the dynamic DAG 602 may provide the DAG 902 and its DAG operations 204*a*-204*c*, 206*a*, and 206*b* at a particular time and under particular operation conditions for the dynamic DAG performance system 200, the use of the dynamic DAG 602 at a different time and/or under different operating conditions for the dynamic DAG performance system 200 may result in a DAG with one or more DAG operations performed by compute systems that are different than those illustrated and described below as performing the corresponding DAG operations 204*a*-204*c*, 206*a*, and 206*b*.

As such, for any compute system selected to perform a DAG operation in the dynamic DAG that was requested to be performed at block 402, the DAG management engine 304 in the DAG management system 202/300 may generate a respective instruction that includes the DAG operation having the instruction set that was generated by the DAG compiler sub-engine 304*b* for execution by that compute system, as well as any other instruction information that one of skill in the art in possession of the present disclosure would recognize as providing the functionality described below. However, while the generation of instructions for compute systems at block 414 has been described as including the generation of instruction sets that enable those compute system to perform the DAG operation they were selected to perform, the compute systems may be enabled to perform the DAG operations they were selected to perform in other manners that will fall within the scope of the present disclosure as well.

For example, in other embodiments of block 414, a plurality of instruction sets for each DAG operation in the dynamic DAG may be provided (e.g., as "fat" binaries for each DAG operation in the DAG management database 306) such that a respective instruction set is available for each compute system type that may be configured to perform that DAG operation (e.g., a CPU instruction set, a GPU instruction set, an ASIC instruction set, and FPGA instruction set, etc.). As such, one of skill in the art in possession of the present disclosure will appreciate how the DAG management engine 304 may be configured, following the request to perform a dynamic DAG, to select a compute system that includes a compute system type that is configured to perform each DAG operation in that dynamic DAG, and then retrieve the instruction sets that are executable by those compute system/compute system types to perform those DAG operations in order to allow the compute systems selected to perform those DAG operations to do so.

As such, with reference back to FIG. 8A, in an embodiment of block 414 the DAG compiler sub-engine 304*b* in the DAG management engine 304 of the DAG management system 202/300 may perform the instruction generation operations 800*a* that may include retrieving the DAG operation 210*a* that is based on the DAG operation 600*a* (e.g., that is configured to perform the functional requirements of the DAG operation 600*a*) and that includes the instruction set that is configured for execution by the compute system 210 that was selected to perform the DAG operation 600*a* at block 412. Similarly, at block 414, the DAG compiler sub-engine 304*b* in the DAG management engine 304 of the DAG management system 202/300 may perform the instruction generation operations 800*b* that may include retrieving the DAG operation 208*a* that is based on the DAG operation 600*b* (e.g., that is configured to perform the functional requirements of the DAG operation 600*b*) and that includes the instruction set that is configured for execution by the compute system 208 that was selected to perform the DAG operation 600*b* at block 412. Similarly as well, at block 414, the DAG compiler sub-engine 304*b* in the DAG management engine 304 of the DAG management system 202/300 may perform the instruction generation operations 800*c* that may include retrieving the DAG operation 210*b* that is based on the DAG operation 600*c* (e.g., that is configured to perform the functional requirements of the DAG operation 600*c*) and that includes the instruction set that is configured for execution by the compute system 210 that was selected to perform the DAG operation 600*c* at block 412.

Similarly as well, at block 414, the DAG compiler sub-engine 304*b* in the DAG management engine 304 of the DAG management system 202/300 may perform the instruction generation operations 800*d* that may include retrieving the DAG operation 208*b* that is based on the DAG operation 600*d* (e.g., that is configured to perform the functional requirements of the DAG operation 600*d*) and that includes the instruction set that is configured for execution by the compute system 208 that was selected to perform the DAG operation 600*d* at block 412. Similarly as well, at block 414, the DAG compiler sub-engine 304*b* in the DAG management engine 304 of the DAG management system 202/300 may perform the instruction generation operations 800*c* that may include retrieving the DAG operation 208*c* that is based on the DAG operation 600*c* (e.g., that is configured to perform the functional requirements of the DAG operation 600*c*) and that includes the instruction set that is configured for execution by the compute system 208 that was selected to perform the DAG operation 600*e* at block 412. Similarly as well, at block 414, the DAG compiler sub-engine 304*b* in the DAG management engine 304 of the DAG management system 202/300 may perform the instruction generation operations 800*f* that may include retrieving the DAG operation 210*c* that is based on the DAG operation 600*f* (e.g., that is configured to perform the functional requirements of the DAG operation 600*f*) and that includes the instruction set that is configured for execution by the compute system 210 that was selected to perform the DAG operation 600*f* at block 412.

Thus, with reference back to FIG. 8B, one of skill in the art in possession of the present disclosure will recognize how the instruction generation operations 800*a*-800*f* operate to transform the dynamic DAG 600 including the DAG operations 600*a*-600*f* to the DAG 802, and while the dynamic DAG 600 may provide the DAG 802 and its DAG operations 210*a*-210*c* and 208*a*-208*c* at a particular time and under particular operation conditions for the dynamic DAG performance system 200, the use of the dynamic DAG 600 at a different time and/or under different operating conditions for the dynamic DAG performance system 200 may result in a DAG with one or more DAG operations performed by compute systems that are different than those illustrated and described below as performing the corresponding DAG operations 210*a*-210*c* and 208*a*-208*c*.

Furthermore, with reference back to FIG. 9A, in an embodiment of block 414 the DAG compiler sub-engine 304*b* in the DAG management engine 304 of the DAG management system 202/300 may perform the instruction generation operations 900*a* that may include retrieving the DAG operation 204*a* that is based on the DAG operation 602*a* (e.g., that is configured to perform the functional requirements of the DAG operation 602*a*) and that includes the instruction set that is configured for execution by the compute system 204 that was selected to perform the DAG operation 602*a* at block 412. Similarly, at block 414, the DAG compiler sub-engine 304*b* in the DAG management engine 304 of the DAG management system 202/300 may perform the instruction generation operations 900*b* that may include retrieving the DAG operation 204*b* that is based on the DAG operation 602*b* (e.g., that is configured to perform the functional requirements of the DAG operation 602*b*) and that includes the instruction set that is configured for execution by the compute system 204 that was selected to perform the DAG operation 602*b* at block 412. Similarly as well, at block 414, the DAG compiler sub-engine 304*b* in the DAG management engine 304 of the DAG management system 202/300 may perform the instruction generation operations 900*c* that may include retrieving the DAG operation 206*a* that is based on the DAG operation 602*c* (e.g., that is configured to perform the functional requirements of the DAG operation 602*c*) and that includes the instruction set that is configured for execution by the compute system 206 that was selected to perform the DAG operation 602*c* at block 412.

Similarly as well, at block 414, the DAG compiler sub-engine 304*b* in the DAG management engine 304 of the DAG management system 202/300 may perform the instruction generation operations 900*d* that may include retrieving the DAG operation 206*b* that is based on the DAG operation 602*d* (e.g., that is configured to perform the functional requirements of the DAG operation 602*d*) and that includes the instruction set that is configured for execution by the compute system 206 that was selected to perform the DAG operation 602*d* at block 412. Similarly as well, at block 414, the DAG compiler sub-engine 304*b* in the DAG management engine 304 of the DAG management system 202/300 may perform the instruction generation operations 900*c* that may include retrieving the DAG operation 204*c* that is based on the DAG operation 602*e* (e.g., that is configured to perform the functional requirements of the DAG operation 602*e*) and that includes the instruction set that is configured for execution by the compute system 204 that was selected to perform the DAG operation 602*e* at block 412.

Thus, with reference back to FIG. 9B, one of skill in the art in possession of the present disclosure will recognize how the instruction generation operations 900*a*-900*e* operate to transform the dynamic DAG 602 including the DAG operations 602*a*-602*e* to the DAG 902, and while the dynamic DAG 602 may provide the DAG 902 and its DAG operations 204*a*-204*c*, 206*a*, and 206*b* at a particular time and under particular operation conditions for the dynamic DAG performance system 200, the use of the dynamic DAG 602 at a different time and/or under different operating conditions for the dynamic DAG performance system 200 may result in a DAG with one or more DAG operations performed by compute systems that are different than those illustrated and described below as performing the corresponding DAG operations 204*a*-204*c*, 206*a*, and 206*b*.

As such, for any compute system selected to perform a DAG operation in the dynamic DAG that was requested to be performed at block 402, the DAG management engine 304 in the DAG management system 202/300 may generate a respective instruction that includes the DAG operation having the instruction set that is retrieved by the DAG management engine 304 and that was previously configured for execution by that compute system, as well as any other instruction information that one of skill in the art in possession of the present disclosure would recognize as providing the functionality described below. However, while the generation of instructions for compute systems at block 414 has been described as including the retrieval of previously generated instruction sets that enable those compute system to perform the DAG operation they were selected to perform, the compute systems may be enabled to perform the DAG operations they were selected to perform in other manners that will fall within the scope of the present disclosure as well.

For example, as discussed in further detail below, the generation or retrieval of instruction sets to perform a DAG operation, described as being performed by the DAG management engine 304 in the DAG management system 202/300 above, may instead be performed by the compute system that was selected to perform that DAG operation. As such, in some embodiments of block 414 and for any compute system selected to perform a DAG operation in the dynamic DAG that was requested to be performed at block 402, the DAG management engine 304 in the DAG management system 202/300 may generate a respective instruction to perform that DAG operation that does not include the instruction set required to perform that DAG operation.

Figure 10A:
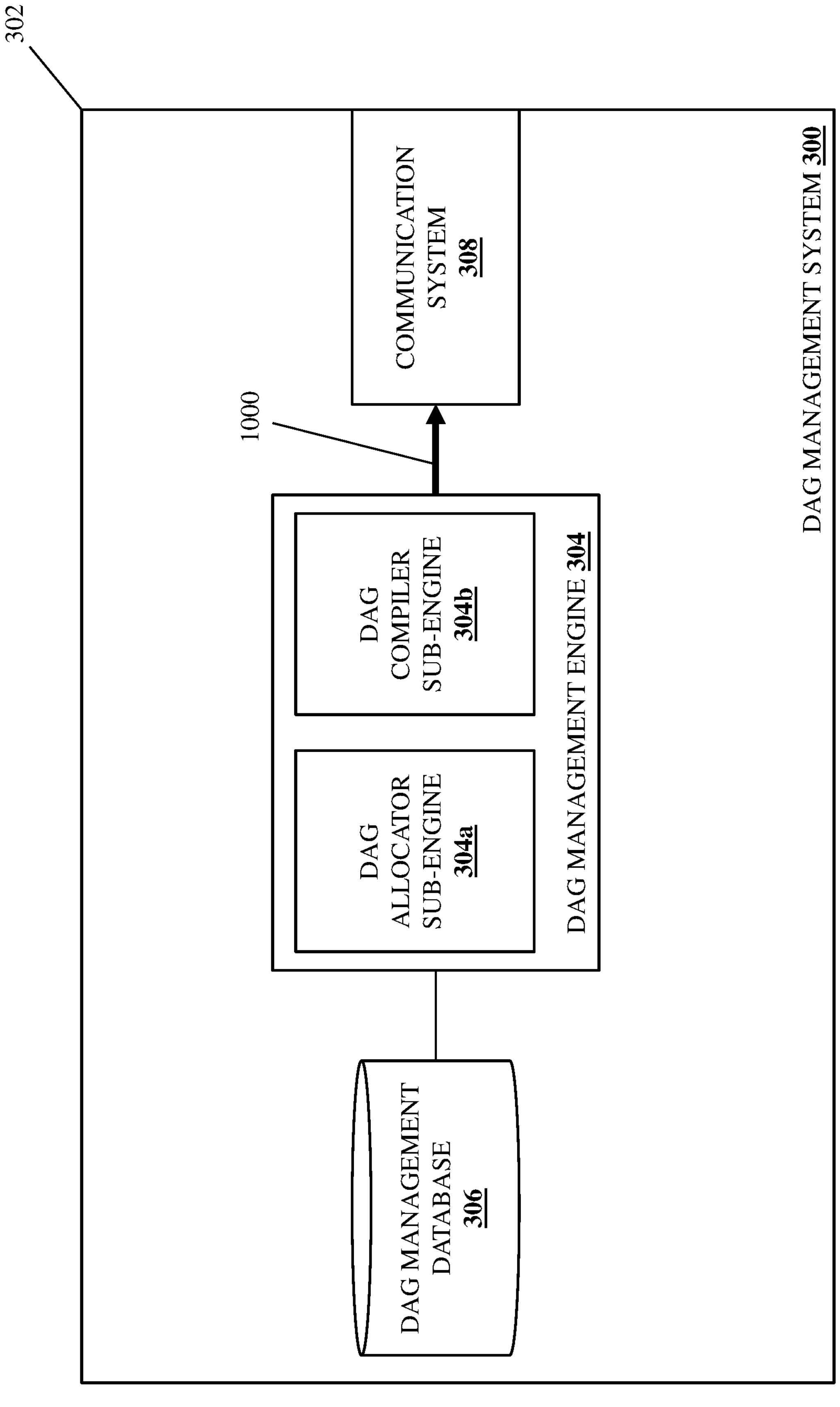
FIG. 10A is a schematic view illustrating an embodiment of the DAG management system of FIG. 3 operating during the method of FIG. 4.
Figure 10B:
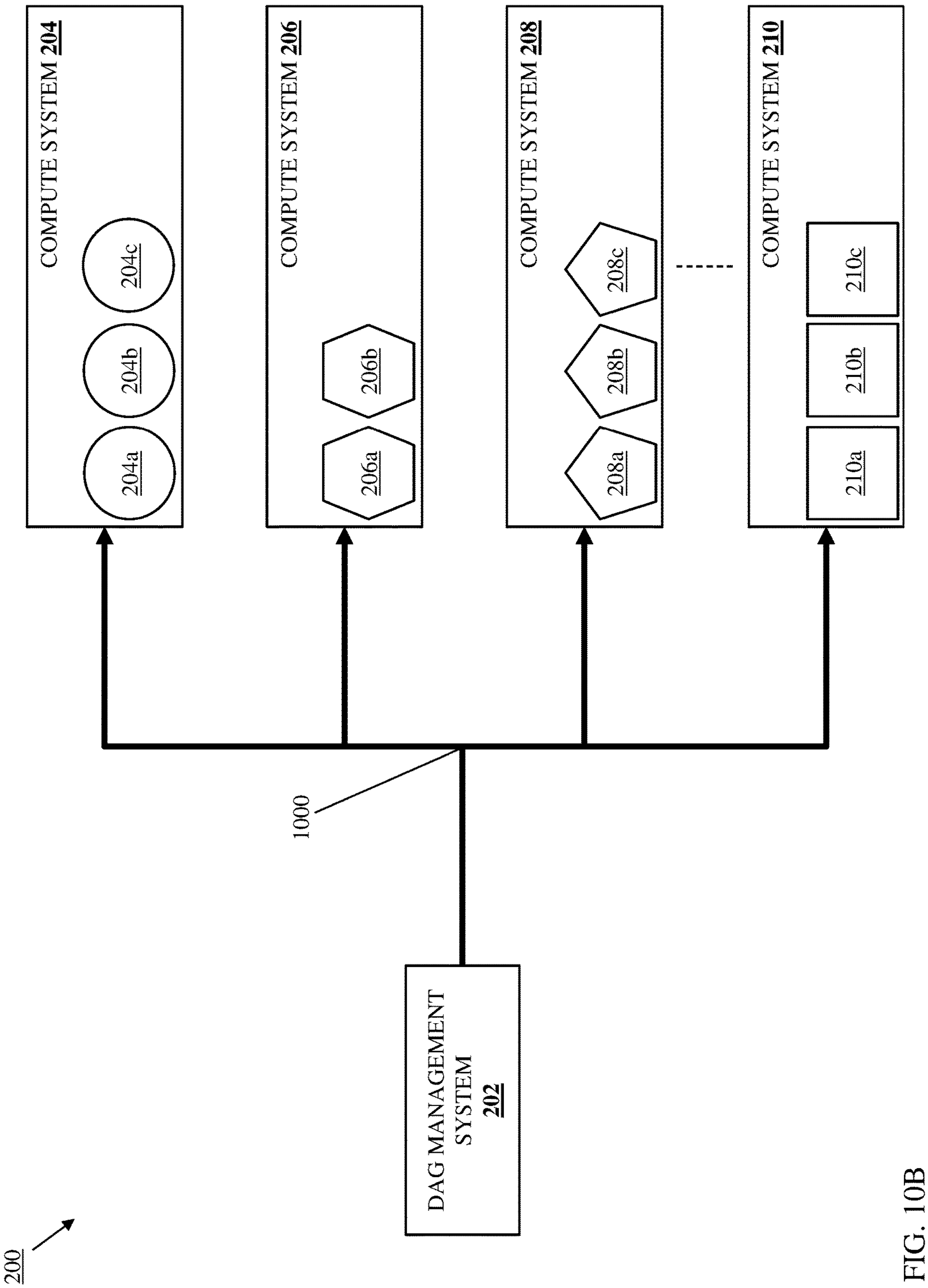
FIG. 10B is a schematic view illustrating an embodiment of the dynamic DAG performance system of FIG. 2 operating during the method of FIG. 4.

The method 400 then proceeds to block 416 where the DAG management system transmits the respective instructions to each respective compute system. With reference to FIGS. 10A and 10B, in an embodiment of block 416, the DAG management engine 304 in the DAG management system 202/300 may perform instruction transmission operations 1000 that may include transmitting the respective instructions generated at block 414 via its communication system 308 and to the compute systems for which they were generated. As discussed above, in some embodiments, each of the instructions generated at block 414 and transmitted to a compute system at block 416 may include the instruction set (i.e., generated or retrieved by the DAG management system 202) required for execution by that compute system to perform one of the DAG operations in a dynamic DAG.

For example, as illustrated in FIG. 10B, the instruction transmission operations 1000 may include the transmission of instructions for the DAG operations included in both of the DAGs 802 and 902 discussed above, and may result in the compute system 204 performing the DAG operations 204*a*, 204*b*, and 204*c* (e.g., via execution of the instruction sets in those DAG operations 204*a*, 204*b*, and 204*c* by the compute system 204), the compute system 206 performing the DAG operations 206*a* and 206*b* (e.g., via execution of the instruction sets in those DAG operations 206*a* and 206*b* by the compute system 206), the compute system 206 performing the DAG operations 208*a*, 208*b*, and 208*c* (e.g., via execution of the instruction sets in those DAG operations 208*a*, 208*b*, and 208*c* by the compute system 208), and the compute system 210 performing the DAG operations 210*a*. 210*b*, and 210*c* (e.g., via execution of the instruction sets in those DAG operations 210*a*, 210*b*, and 210*c* by the compute system 210). As such, one of skill in the art in possession of the present disclosure will appreciate how the utilization of the dynamic DAGs 600 and 602 in place of the DAGs 512 and 514 discussed above with reference to FIG. 5B may provide for a relatively even DAG operation "loading" across the compute systems 204-210.

However, in embodiments of block 414 in which the DAG management engine 304 in the DAG management system 202/300 generates respective instructions to perform DAG operations that do not include the instruction set required to perform that DAG operation, any of the compute systems 204-210 may receive one of those instructions and, in response, generate the instruction set required for execution by that compute system to perform the DAG operation similarly as described above by the DAG management engine 304 in the DAG management system 202/300, or retrieve the instruction set required for execution by that compute system to perform the DAG operation similarly as described above by the DAG management engine 304 in the DAG management system 202/300.

In some examples, a compute system may include multiple compute devices of the compute system type (e.g., an FPGA and an ASIC) that are configured to perform a DAG operation, and in response to receiving an instruction to perform a DAG operation from the DAG management system 202/300 that does not include the instruction set required to perform that DAG operation, may determine which of those compute devices to use to perform that DAG operation (e.g., based on factors similar to those used by the DAG management system 202/300 discussed above), and then generate or retrieve the instruction set required by that compute device to perform that DAG operation. One of skill in the art in possession of the present disclosure will appreciate how such embodiments may be particularly beneficial in a compute system that is provided at an "edge" of a network and in which the resource demands may be unknown to the DAG management system 202/300.

Thus, systems and methods have been described that provide dynamic DAGs that each identify a plurality of DAG operations that are not statically configured for performance by particular compute system types, and instead may be performed by compute systems having compute system types that are determined subsequent to the receiving of a request to perform the DAG. As will be appreciated by one of skill in the art in possession of the present disclosure, such dynamic DAG performance systems allow for the use of alternative resources that may be capable of performing a DAG operation with relatively higher performance, relatively lower cost, relatively lower resource utilization, and/or other benefits known in the art, thus enabling optimal resource allocation in the performance of DAGs and corresponding servicing of applications and/or other entities that require the performance of those DAGs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Directed Acyclic Graph (DAG) performance system, comprising:

a plurality of compute systems; and a Directed Acyclic Graph (DAG) management system that is coupled to each of the plurality of compute systems via a network and that is configured to:

store a dynamic DAG that:

identifies, for each of a plurality of DAG operations included in the dynamic DAG, a DAG operation functional requirement for that DAG operation;

does not identify a compute system type for performing any of the DAG operation functional requirements; and does not include an instruction set that is configured for execution by a compute system to perform any of the plurality of DAG operations;

receive a request to perform the dynamic DAG;

identify the plurality of DAG operations that are included in the dynamic DAG and the respective DAG operation functional requirement for each of the plurality of DAG operations;

determine, for each of the plurality of DAG operations, a respective compute system type that is configured to satisfy the respective DAG operation functional requirement for that DAG operation;

identify, for each of the plurality of DAG operations, one of the plurality of compute systems that provides the respective compute system type that is configured to satisfy the respective DAG operation functional requirement for that DAG operation based on at least of one of:

a relative proximity to data utilized in the DAG operation for which that compute system is selected as compared to the others of the plurality of compute systems; and a relative number of data transfers required to transfer data to that compute system to perform the DAG operation for which that compute system is selected as compared to the others of the plurality of compute systems;

compile, for each of the plurality of DAG operations, a respective instruction set that is configured for execution by the respective one of the plurality of compute systems that includes the respective compute system type that is configured to satisfy the DAG operation functional requirement for that DAG operation; and transmit, for each of the plurality of DAG operations, the respective instruction set compiled for that DAG operation via the network to the one of the plurality of compute systems that includes the respective compute system type that is configured to satisfy the DAG operation functional requirement for that DAG operation, wherein each one of the plurality of compute systems is configured to:

execute the respective instruction set transmitted to that compute system to perform the DAG operation for which that respective instruction set was compiled.

2. The system of claim 1, wherein the dynamic DAG represents the plurality of DAG operations as abstracted, intermediate forms defined by the Open Neural Network eXchange (ONNX) standards.

3. The system of claim 1, wherein the DAG operation functional requirements for each of the plurality of DAG identifies inputs consumed and outputs generated.

4. The system of claim 1, wherein the DAG management system is configured, for a first DAG operation included in the plurality of DAG operations, to:

identify a first compute system and a second compute system of the plurality of compute systems that each provide the respective compute system type that is configured to satisfy the respective DAG operation functional requirement for the first DAG operation.

5. The system of claim 4, wherein the DAG management system is configured to:

select the first compute system based on a relative proximity to data utilized in the DAG operation for which the first compute system is selected as compared to the second compute systems.

6. The system of claim 4, wherein the DAG management system is configured to:

Select the first compute system based on a relative number of data transfers required to transfer data to the first compute system as compared to the second compute system.

7. An Information Handling System (IHS), comprising:

a processing system; and a memory system that is coupled to the processing system and that includes instructions that, when executed by the processing system, cause the processing system to provide a Directed Acyclic Graph (DAG) management engine that is configured to:

store a dynamic DAG that:

identifies, for each of a plurality of DAG operations included in the dynamic DAG, a DAG operation functional requirement for that DAG operation;

does not identify a compute system type for performing any of the DAG operation functional requirements; and does not include an instruction set that is configured for execution by a compute system to perform any of the plurality of DAG operations;

receive a request to perform the dynamic DAG;

identify the plurality of DAG operations that are included in the dynamic DAG and the respective DAG operation functional requirement for each of the plurality of DAG operations;

determine, for each of the plurality of DAG operations, a respective compute system type that is configured to satisfy the respective DAG operation functional requirement for that DAG operation;

identify, for each of the plurality of DAG operations, one of a plurality of compute systems that provides the respective compute system type that is configured to satisfy the respective DAG operation functional requirement for that DAG operation based on at least of one of:

a relative proximity to data utilized in the DAG operation for which that compute system is selected as compared to the others of the plurality of compute systems; and a relative number of data transfers required to transfer data to that compute system to perform the DAG operation for which that compute system is selected as compared to the others of the plurality of compute systems;

compile, for each of the plurality of DAG operations, a respective instruction set that is configured for execution by the respective one of the plurality of compute systems that includes the respective compute system type that is configured to satisfy the DAG operation functional requirement for that DAG operation; and transmit, for each of the plurality of DAG operations, the respective instruction set compiled for that DAG operation via the network to the one of the plurality of compute systems that includes the respective compute system type that is configured to satisfy the DAG operation functional requirement for that DAG operation to cause each one of the plurality of compute systems to execute the respective instruction set transmitted to that compute system to perform the DAG operation for which that respective instruction set was compiled.

8. The IHS of claim 7, wherein the dynamic DAG represents the plurality of DAG operations as abstracted, intermediate forms defined by the Open Neural Network exchange (ONNX) standards.

9. The IHS of claim 7, wherein the DAG operation functional requirements for each of the plurality of DAG identifies inputs consumed and outputs generated.

10. The IHS of claim 7, wherein the DAG management system is configured to:

identify a first compute system and a second compute system of the plurality of compute systems that each provide the respective compute system type that is configured to satisfy the respective DAG operation functional requirement for the first DAG operation.

11. The IHS of claim 10, wherein the DAG management system is configured to:

select the first compute system based on a relative proximity to data utilized in the DAG operation for which the first compute system is selected as compared to the second compute systems.

12. The IHS of claim 10, wherein the DAG management system is configured to:

select the first compute system based on a relative number of data transfers required to transfer data to the first compute system as compared to the second compute systems.

13. The IHS of claim 7, wherein the respective instruction set is compiled for each of the plurality of DAG operations subsequent to receiving the request to perform the dynamic DAG.

14. A method for performing dynamic Directed Acyclic Graphs (DAGs), comprising:

storing, by a Directed Acyclic Graph (DAG) management system, a dynamic DAG that:

identifies, for each of a plurality of DAG operations included in the dynamic DAG, a DAG operation functional requirement for that DAG operation;

does not identify a compute system type for performing any of the DAG operation functional requirements; and does not include an instruction set that is configured for execution by a compute system to perform any of the plurality of DAG operations;

receiving, by the DAG management system, a request to perform the dynamic DAG;

identifying, by the DAG management system, the plurality of DAG operations that are included in the dynamic DAG the respective DAG operation functional requirement for each of the plurality of DAG operations;

determining, by the DAG management system for each of the plurality of DAG operations, a respective compute system type that is configured to satisfy the respective DAG operation functional requirement for that DAG operation;

identifying, by the DAG management system for each of the plurality of DAG operations, one of a plurality of compute systems that provides the respective compute system type that is configured to satisfy the respective DAG operation functional requirement for that DAG operation based on at least of one of:

a relative proximity to data utilized in the DAG operation for which that compute system is selected as compared to the others of the plurality of compute systems; and a relative number of data transfers required to transfer data to that compute system to perform the DAG operation for which that compute system is selected as compared to the others of the plurality of compute systems;

compiling, by the DAG management system for each of the plurality of DAG operations, a respective instruction set that is configured for execution by the respective one of the plurality of compute systems that includes the respective compute system type that is configured to satisfy the DAG operation functional requirement for that DAG operation;

transmitting, by the DAG management system for each of the plurality of DAG operations, the respective instruction set compiled for that DAG operation via the network to the one of the plurality of compute systems that includes the respective compute system type that is configured to satisfy the DAG operation functional requirement for that DAG operation; and executing, each one of the plurality of compute systems, the respective instruction set transmitted to that compute system to perform the DAG operation for which that respective instruction set was compiled.

15. The method of claim 14, wherein the dynamic DAG represents the plurality of DAG operations as abstracted, intermediate forms defined by the Open Neural Network exchange (ONNX) standards.

16. The method of claim 14, wherein the DAG operation functional requirements for each of the plurality of DAG identifies inputs consumed and outputs generated.

17. The method of claim 14, further comprising:

identifying, by the DAG management system, a first compute system and a second compute system of the plurality of compute systems that each provide the respective compute system type that is configured to satisfy the respective DAG operation functional requirement for the first DAG operation.

18. The method of claim 17, further comprising:

selecting, by the DAG management system, the first compute system based on a relative proximity to data utilized in the DAG operation for which the first compute system is selected as compared to the second compute systems.

19. The method of claim 17, further comprising:

selecting, by the DAG management system, the first compute system based on a relative number of data transfers required to transfer data to the first compute system as compared to the second compute systems.

20. The method of claim 14, wherein the respective instruction set is compiled for each of the plurality of DAG operations subsequent to receiving the request to perform the dynamic DAG.

* * * * *